US00RE38305E

(19) United States
(12) Reissued Patent
Gunjima et al.

(10) Patent Number: US RE38,305 E
(45) Date of Reissued Patent: Nov. 11, 2003

(54) LCD DEVICE INCLUDING AN ILLUMINATION DEVICE HAVING A POLARIZED LIGHT SEPARATING SHEET BETWEEN A LIGHT GUIDE AND THE DISPLAY

(75) Inventors: Tomoki Gunjima, Chikushinoshi (JP); Yoshiharu Ooi, Koriyama (JP); Masao Ozeki, Yokohamashi (JP); Hiroaki Ito, Yokohamashi (JP); Hiroshi Hasebe, Kowloon (JP); Tetsuro Matsumoto, Chibashi (JP); Yutaka Nakagawa, Iseharashi (JP)

(73) Assignee: Asahi Glass Company Ltd., Tokyo (JP)

( * ) Notice: This patent is subject to a terminal disclaimer.

(21) Appl. No.: 09/512,735

(22) Filed: Feb. 24, 2000

Related U.S. Patent Documents

Reissue of:
(64) Patent No.: 5,587,816
Issued: Dec. 24, 1996
Appl. No.: 08/530,012
Filed: Oct. 19, 1995

U.S. Applications:

(62) Division of application No. 09/016,409, filed on Jan. 30, 1998, now Pat. No. Re. 37,377, which is a continuation of application No. 08/132,864, filed on Oct. 7, 1993, now abandoned.

(30) Foreign Application Priority Data

| | | |
|---|---|---|
| Oct. 9, 1992 | (JP) | 4-298021 |
| Dec. 16, 1992 | (JP) | 4-354651 |
| Feb. 17, 1993 | (JP) | 5-051594 |
| May 28, 1993 | (JP) | 5-151260 |
| Jun. 2, 1993 | (JP) | 5-156142 |

(51) Int. Cl.[7] ..... G02F 1/1335

(52) U.S. Cl. ..... 349/9; 349/96; 349/62; 349/113

(58) Field of Search ..... 349/9, 62, 64, 349/96, 115; 359/487, 490

(56) References Cited

U.S. PATENT DOCUMENTS

| | | | |
|---|---|---|---|
| 4,214,257 A | 7/1980 | Yamauchi | 358/3 |
| 4,492,449 A | 1/1985 | Oinoue et al. | 354/407 |

(List continued on next page.)

FOREIGN PATENT DOCUMENTS

| | | |
|---|---|---|
| JP | 62-278506 | 12/1987 |
| JP | 189627 | 7/1989 |

(List continued on next page.)

OTHER PUBLICATIONS

"Polarized Backlight for Liquid Crystal Display", vol. 33, No. 1B (Jun. 1990) IBM Technical Disclosure Bulletin, pp. 143–144.*

(List continued on next page.)

*Primary Examiner*—William L. Spikes
*Assistant Examiner*—Toan Ton
(74) *Attorney, Agent, or Firm*—Oblon, Spivak, McClelland, Maier & Neustadt, P.C.

(57) ABSTRACT

An illumination device for a direct viewing type display element comprising a flat light guide; a light source set such that light is incident on a side portion of said flat light guide; a polarized light separating flat set on a first side of a light emitting side of the flat light guide for transmitting a p polarized light component and reflecting at least a portion of an a polarized light component with respect to a light ray substantially having a predetermined direction of incidence; and a light reflecting sheet disposed on a second side opposite to said light emitting side of the flat light guide in parallel with the light emitting site.

22 Claims, 5 Drawing Sheets

U.S. PATENT DOCUMENTS

| | | | | |
|---|---|---|---|---|
| 4,646,215 | A | 2/1987 | Levin et al. | 362/296 |
| 4,798,448 | A | 1/1989 | van Raalte | 359/49 |
| 5,042,921 | A | 8/1991 | Sato et al. | 359/49 |
| 5,064,276 | A | 11/1991 | Endo et al. | 359/49 |
| 5,101,193 | A | 3/1992 | Smith et al. | 340/479 |
| 5,124,841 | A | 6/1992 | Oishi | |
| 5,126,882 | A | 6/1992 | Oe et al. | |
| 5,153,752 | A | 10/1992 | Kurematsu et al. | 359/40 |
| 5,200,843 | A | 4/1993 | Karasawa et al. | 359/40 |
| 5,418,631 | A | 5/1995 | Tedesco | 359/69 |
| 5,422,756 | A | 6/1995 | Weber | |
| 5,467,417 | A | 11/1995 | Nakamura et al. | 359/40 |
| 5,550,676 | A | 8/1996 | Ohe et al. | |
| 5,686,979 | A | 11/1997 | Weber et al. | |

FOREIGN PATENT DOCUMENTS

| | | |
|---|---|---|
| JP | 01-189627 | 7/1989 |
| JP | 2-17 | 1/1990 |
| JP | 3-15002 | 1/1991 |
| JP | 03-156421 | 7/1991 |
| JP | 3-157621 | 7/1991 |
| JP | 04-110990 | 4/1992 |
| JP | 04-128818 | 4/1992 |
| JP | 04-162002 | 6/1992 |
| JP | 4-184429 | 7/1992 |
| JP | 5-059657 | 2/1993 |
| JP | 5-076217 | 3/1993 |
| JP | 5-095573 | 3/1993 |
| JP | 5-184524 | 6/1993 |
| JP | 5-235666 | 8/1993 |
| JP | 5-217211 | 9/1993 |
| JP | 5-235670 | 8/1999 |
| WO | WO 92/04648 | 3/1992 |
| WO | WO 94/29765 | 12/1994 |
| WO | PCT/US94/14324 | 2/1995 |
| WO | PCT/US94/14325 | 2/1995 |
| WO | PCT/US94/14814 | 2/1995 |
| WO | PCT/US94/14323 | 3/1995 |

OTHER PUBLICATIONS

Patent Abstracts of Japan, vol. 016, No. 506(P–1440), Oct. 20, 1992 JP–A04 184 429, Jul. 1, 1992.*

English Translation of an Official Action dated Jan. 25, 2002 for Japanese Patent No. Hei 5–235670.

English Translation of an Official Action dated Jan. 25, 2002 for Japanese Patent No. Hei 5–151260.

European Patent Office Communication Under Rule 51(4)EPC.

Gunjima, et al, "532–2 New Back–Lighting Device for Liquid Crystal Displays", Proceedings of the Fifteenth International Display Research Conference; Asia Display '95; Oct. 16–18, 1995; ACT City Hamamatsu, Hamamatsu, Japan; pp. 731–734.

"P–61: Retroreflecting Sheet Polarizer"; SID 93 Digest; M.F. Weber, 3M, St. Paul., MN; pp. 669–672.

"A Recent Advance in Reflective Polarizer Technology"; 3M Optical Systems Department; David L. Wortman; pp. M98–M106.

Los Angeles Times article: "Polarization Brings Conservation to Lighting"; Jill Stewart; Sep. 10, 1990; (1 page).

"Multilayer Polarizers and their application to General Polarized Lighting" by Alvin M. Marks; Feb. 1959; pp. 123–135.

English Translation of Japanese Official Action with Search Report.

Patent Abstracts of Japan, vol. 014, No. 129 (P–1020), Mar. 12, 1990, JP 02 000017, Jan. 5, 1990.

Patent Abstracts of Japan, vol. 016, No. 418 (P–1413), Sep. 3, 1992, JP 04 141603, May 15, 1992.

* cited by examiner

LCD DEVICE INCLUDING AN ILLUMINATION DEVICE HAVING A POLARIZED LIGHT SEPARATING SHEET BETWEEN A LIGHT GUIDE AND THE DISPLAY

Matter enclosed in heavy brackets [ ] appears in the original patent but forms no part of this reissue specification; matter printed in italics indicates the additions made by reissue.

*More than one reissue application has been filed for the reissue of U.S. Pat. No. 5,587,816. The reissue applications are application Ser. Nos. 09/512,735, and 09/016,09, filed on Jan. 30, 1998, now U.S. Patent RE37,377, issued on Sept. 18, 1002, all of which are divisional reissues of U.S. Pat. No. 5,587,816.*[This application] *U.S. Pat. No. 5,587,816* is a Continuation of application Ser. No. 08/132,864, filed on Oct. 7, 1993, now abandoned.

The present invention relates to a direct viewing type liquid crystal display device which is employed in a liquid crystal television set, a liquid crystal display for a computer and the like.

In recent years, the technical progress of a direct viewing type liquid crystal display device is significant especially in a device employing a color display element. There are many displays having a display quality which is comparable to that of a CRT. In the black-white display, until several years before, the main stream of technology had been a reflecting type liquid crystal display element which did not employ a backlight. However, currently, almost all of them are replaced by a transmitting type liquid crystal display element in use of a backlight even in the black-white display. In the color liquid crystal display, the display can not work without a backlight, and the backlight is an indispensable device in the direct viewing type liquid crystal display device.

In a so-called "notebook type personal computer" which has come in use in recent years, the portability is important, and therefore, driving thereof by a battery is indispensable. However, currently, the time capable of driving the device without charging the battery is only several hours, and does not reach a level wherein a day's operation can continuously be performed. From this viewpoint, the prolongation of the time of continuous use is extremely important. Especially, the illumination device is a device consuming much power in that system, and reducing the power consumption of the illumination device is of great significance.

In the mean time, there is a specific contrast ratio distribution in accordance with the viewing angle in a liquid crystal display element employed in the notebook type personal computer. A representative example is shown in FIG. 5 in case of a super twisted nematic liquid crystal display element. FIG. 5 shows the representative viewing cone of the super twisted nematic liquid crystal display element and a diagram designating a change in the contrast ratio of a section on a horizontal line passing through the center of the contrast ratio of the viewing cone. According to FIG. 5, the viewing angle of the liquid crystal display element is widened from a direction perpendicular to the image plane substantially by 40° through 50°, and it is revealed that there is a region having an especially high contrast ratio in the vicinity of the center.

In an actual use, the device is often set such that the contrast ratio is maximized on the image plane viewed from an operator in case of the notebook type personal computer. Accordingly, the illuminating efficiency can substantially be promoted, when the maximum brightness of illumination is formed in the viewing direction (mostly a direction perpendicular to an image plane or a direction a little deviated therefrom) which causes the maximum contrast ratio.

The viewing angle of the liquid crystal display element employed in the notebook type personal computer is widened substantially to not less than 40° through 50°, and investigations are being performed for widening the viewing angle. Therefore, it is important to adjust the light direction distribution of the illumination device so that the display can be viewed from a more or less oblique direction.

The adapting of the brightness distribution of the illumination device to this contrast ratio distribution in such a manner is significant as a means for promoting substantial brightness.

The color liquid crystal display device is grossly classified into two systems, namely, a twisted nematic (TN) liquid crystal display device by the active matrix driving using TFTs and a super twisted nematic (STN) liquid crystal display device by the multiplex driving. Both are provided with a construction wherein polarizing sheets are disposed on the light-incident side and the light-emitting side of an element wherein the liquid crystal layer is hold by glass substrates, and the liquid crystal display system is operated by modulating the polarization state of an incident linearly polarized light.

However, the direction of polarization of the incident light of the conventional liquid crystal display element, is not uniform due to the randomly polarized light. Therefore, more than half of the incident light is absorbed by the polarizing sheet disposed on the light-incident side of the display element, and does not substantially contribute to the illuminating light. It is proposed as a structure for reusing the light to be absorbed by the polarizing sheet, wherein a polarized light separator is interposed between a light source lamp and a liquid crystal display device in a projecting type liquid crystal display element, for separating a non-polarized light to mutually orthogonal polarized lights, one polarized light is directly emitted from the polarized light separator, and the other polarized light is converged to the light source lamp and is reused as a light source light (Japanese Unexamined Patent Publication No. 184429/1992).

However, this method is performed on the premise of a projector (projecting type), and it is necessary to provide a sufficient distance between the light source and the polarized light separator. Further, the device effectively functions as an illumination for the projecting type liquid crystal display element, only when the light is a considerably collimated parallel ray. Accordingly, the device is not suitable to adopt as the illumination for a direct viewing type display element wherein thinning thereof is an indispensable condition, and the brightness distribution of the illumination device should adapt to the contrast ratio distribution of the liquid crystal display.

Further, it is proposed that a prism array is interposed between a light source for illumination and a display element, as a means for converging light in a direction perpendicular to a display face. However, according to this means, the brightness in the direction perpendicular to the display face is promoted by narrowing the direction of an illuminating light in a specified range, and therefore, the light direction distribution of the illuminating light is narrowed. Further, the brightness in the direction perpendicular to the display face is not sufficient even by this means. Accordingly, an illuminance distribution suitable for the direct viewing type liquid crystal display element can not be provided.

In this invention, attention has been paid to the fact wherein only a polarized light having a specific direction of polarization contributes to the promotion of the illuminance of the directly viewing type liquid crystal display element, and a light in a specific direction is selectively converted its polarization direction, among polarized lights which do not contribute to the promotion of the illuminance of the liquid crystal display element by themselves. In this way, the intensity of light can be enhanced in the specific direction while maintaining a wide light direction distribution, with respect to a polarized light having a direction of polarization which can contribute to the promotion of the illuminance, and the light distribution is suitable for the directly viewing type liquid crystal display.

According to a first aspect of the present invention, there is provided an illumination device for a direct viewing type display element comprising:

a flat light guide;

a light source set such that light is incident on a side portion of said flat light guide;

a polarized light separating sheet set on a first side of a light emitting side of the flat light guide for transmitting a p polarized light component and reflecting at least a portion of an s polarized light component with respect to a light ray substantially having a predetermined direction of incidence; and a light reflecting sheet disposed on a second side opposite to said light emitting side of the flat light guide in parallel with the light emitting site.

According to a second aspect of the present invention, there is provided the illumination device for a direct viewing type display element according to the first aspect, wherein the polarized light separating sheet is comprising a multi-layered structure wherein light transmitting media having a relatively large refractive index and light transmitting media having a relatively small refractive index are laminated.

According to a third aspect of the present invention, there is provided the illumination device for a direct viewing type display element according to the first aspect, wherein the polarized light separating sheet comprises a transparent supporter and at least one dielectric thin film laminated on said transparent supporter having a thickness which is equal to or smaller than a wavelength of visible light.

According to a fourth aspect of the present invention, there is provided the illumination device for a direct viewing type display element according to the first aspect, wherein the polarized light separating sheet comprises a plurality of laminated transparent polymer layers having different refractive indices.

According to a fifth aspect of the present invention, there is provided a liquid crystal display device, wherein the illumination device according to Claim 1 is disposed on a rear side of a direct viewing type liquid crystal display element such that a principle polarization direction of emitted light from the illumination device substantially agrees with a direction of an optical axis of polarization of a polarizing sheet on a light-incident side of a liquid crystal display element.

According to a sixth aspect of the present invention, there is provided the liquid crystal display device according to the fifth aspect further comprising:

a light reflecting means disposed between the polarized light separating sheet and the liquid crystal display element for deflecting a direction of a light ray maximizing a light intensity among light distributing directions to a direction substantially perpendicular to a display face of the liquid crystal display element.

According to a seventh aspect of the present invention, there is provided the liquid crystal display device according to the fifth aspect, further comprising:

a means for rotating polarization direction disposed between the illumination device and the liquid crystal display element for rotating the principle direction of emitted light.

According to an eighth aspect of the present invention, there is provided an illumination device for a direct viewing type display device comprising:

a flat light emitting means for emitting a diffused light including a first polarized light component having a first direction of polarization and a second polarized light component having a second direction of polarization perpendicular to the first direction of polarization; component and a polarized light converting means disposed in an optical path of a light emitted from said flat light emitting means for emitting said first polarized light component and for emitting at least a portion of said second polarized light component after converting said portion of the second polarized light component into the first polarized light component selectively with respect to a light ray substantially having a light direction maximizing a brightness thereof.

Figure 8A:
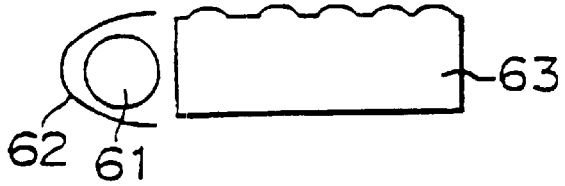
Figure 8B:
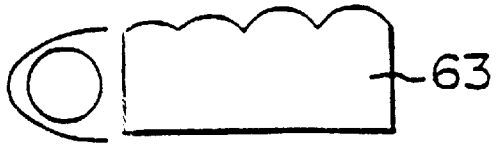
Figure 8C:
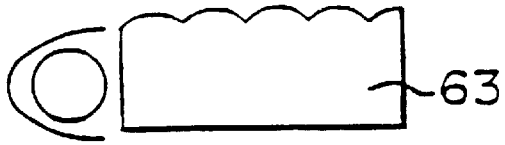
Figure 8D:
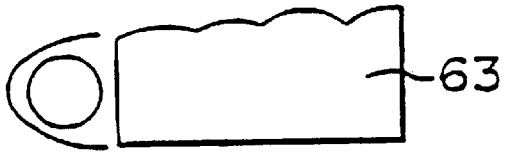
Figure 9A:
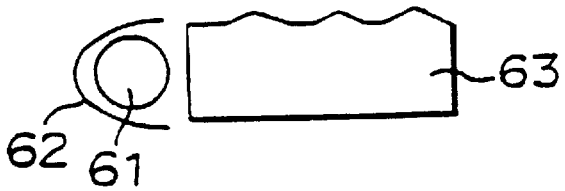
Figure 9B:
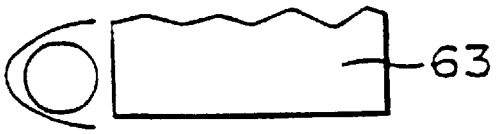

FIGS. 8(a) through 8(d) are sectional diagram respectively showing examples of uniform light forming means of this invention; and FIGS. 9(a) and 9(b) are sectional diagram respectively showing other examples of uniform light forming means of this invention.

Although, there are various systems in manufacturing a flat illumination device, they are grossly classified into two kinds. The most general one is a system which is called the "internal illuminating system" of the "direct method", wherein a light source is disposed just under the display. On the other hand, in the other system which is called the "edge light" type system, the light source or sources are disposed outside the display, for instance, an approximately linear light emitting body or bodies such as fluorescent lamps (mostly cold cathode fluorescent lamp) and the like are attached to one side or two sides of a light guide made of a transparent acrylic resin plate or the like, which is a light illuminating plane, and light is introduced to the light guide by providing a lamp cover composed of a reflector.

It is preferable that the light emitting means of this invention is the edge light type system, which is composed of a flat light emitter and a light source or sources attached such that light is incident on the side portion or portions of the flat light guide, since the edge light type illumination device is compact and is mostly preferable in view of promoting the portability of the liquid crystal display device.

Further, it is preferable to provide a polarized light separating sheet which is installed on the light-emitting face side of the flat light guide, and which transmits the p polarized light component (first polarized light component) and reflects at least a portion of the s polarized light component (second polarized light component) with respect to a light ray having substantially a specific direction of incidence, and a polarized light converting means composed of a guide and a light-reflecting sheet provided to a side of the flat light guide opposite to the light-emitting plane approximately in parallel with the light-emitting plane. When the light-reflecting plane is employed in such a construction, the separated polarized light can be reused and the direction of polarization is changed in the reflection. Accordingly, the light-reflecting plane operates as the polarized light converting means in cooperation with the polarized light separating sheet. In the following, an element having the polarized light separating sheet is called a polarized light separator. However, this does not mean that the polarized light separator is necessary as an element separated from the flat light guide. The flat light guide may be provided with a polarized light separating function.

In this construction, with respect to light having substantially a specified angle as the angle of incidence to the polarized light separator, the p polarized light component which has transmitted through the polarized light separator, is incident on the liquid crystal display element after passing through a polarizing plate, and the s polarized light component is reflected to the inside of the flat light guide. When the reflected and returned s polarized light component is reflected on the surface of the flat light guide, a phase change is caused, and a "p" polarized light component is formed which can transmit through the polarized light separator. Accordingly, a component which is converted into the p polarized light component is formed by reflecting the s polarized light component which has been reflected by the polarized light separator, on the surface of the flat light guide, which contributes to the component transmitting towards the liquid crystal display element. As a result, the flat illumination device is provided with a high illuminance, with respect to a specified viewing direction.

It is preferable that the polarizing sheet provided on the light-incident side of the liquid crystal display element, is disposed such that the transmittance thereof is maximized with respect to the p polarized light component which is emitted from the polarized light separator, for employing the illumination device as the backlight of the liquid crystal display element. That is, an average direction of an optical axis of polarization of a light ray emitted from the flat light guide in the flat illumination device approximately agrees with the optical axis of polarization of the polarizing sheet on the light-incident side of the liquid crystal display element.

The polarized light separator of this invention can employ a multi-layered structure wherein light transmitting media having a relatively large refractive index and other light transmitting media having a relatively small refractive index are alternately laminated, a structure wherein at least one layer of a dielectric film having a thickness of preferably not larger than 1,000 nm is formed at least on one face of a flat light transmitting supporter, or a structure wherein a plurality of kinds of transparent polymer layers having different refractive indices are laminated.

An explanation will be given of a polarized light separator composed of a multi-layer structure wherein light transmitting media having a relatively large refractive index and other light transmitting media having a relatively small refractive index are alternately laminated, as follows.

This multi-layer structure is provided with a property wherein, with respect to an oblique incident light, the transmittance and the reflectance are dependent on the polarization of the oblique incident light. Therefore, the structure can be employed as a light non-absorbing type polarization element. Generally, when, on an interface between an optical material having the refractive index of $n_0$ and another optical material having the refractive index of $n_1$, the angle of incidence $\theta_{01}$ of light which is incident from the optical material having the refractive index of $n_0$ to that of $n_1$ is expressed by the following equation, $$\tan \theta_{01}=n_1/n_0,$$

there is no p polarized light component in the reflected light, the reflected light is composed of the s polarized light, and the transmitted light is composed of the residual s polarized light component and the p polarized light, which is well known. The angle of incidence $\theta_{01}$ is called Brewster's angle $\theta_B$. Accordingly, when the optical material layers having the refractive indices of $n_0$ and $n_1$ are alternately laminated, with respect to light having the angle of incidence which is substantially equal to Brewster's angle, the p polarized light component transmits through the structure, but the s polarized light component is reflected by the plurality of interfaces and its transmitted light component is almost nullified. Accordingly, the emitted light from the above multi-layer structure has a polarization.

The multi-layer structure may be of any components, so far as it is composed of at least two layers of light-transparent materials having different refractive indices. However, since the polarized light dependency of the reflectance at the interface is very effective, when a difference between the interface is very effective, when a difference between the refractive indices is large, a combination wherein the difference of refractive indices is large, is preferable. For instance, there is a combination of air ($n \approx 1.0$) and a transparent resin, such as a plastics ($n \approx 1.5$); acrylic resin, polycarbonate, polyurethane, polystyrene and the like. The above combination is preferable since a multi-layer structure having a large area can be provided cheeply.

There is basically no restriction on the thicknesses of the respective layers of the multi-layer structure. Further, there may be a structure which is inhomogeneous depending on locations, or a structure wherein flat air bubble layers are dispersed in a homogeneous plastics in a lamellar form, so far as the respective layers in the multi-layer structure are disposed substantially in parallel with each other.

It is also possible to employ a transparent dielectric multi-layer film as a material of the structure. When a dielectric multi-layer film is employed for the multi-layer structure, the thickness of layer is to be not less than approximately ten times as much as an order of a wavelength of light, such that lights reflected from interfaces of the respective layers of the multi-layer structure do not interfere with each other, thereby enabling to provide a polarization characteristic having a small wavelength dependency with respect to a white light source. On the other hand, when the thicknesses of the respective layers are too large, the thickness of a total of the multi-layer structure is large, which is not suitable for the light-weight and the thin-shape thereof. Accordingly, the thickness of layer of approximately 3 $\mu$m through 100 $\mu$m is suitable for the purpose. Further, when the film thicknesses are non-uniform, a "coloring" due to the interference of light can be suppressed. Accordingly, there is a case wherein it is preferable to make the thicknesses of the respective layers non-uniform.

In case of a construction wherein flat air bubble layers are dispersed in a homogeneous plastics in a lamellar form, the thickness of the flat air bubble layer is to be approximately 3 μm through 100 μm. As another structure, there is a multi-layer structure wherein a transparent thin plate having a thickness of approximately 3 μm through 100 μm, is laminated on a scattered gap controlling material such as beads, glass fibers or the like. In this case, compared with a structure wherein flat air bubble layer are dispersed in a homogeneous plastics in a lamellar form, a polarization operation having a high light distinguishing ratio can be provided, since the angle of incidence of an interface between materials having different refractive indices does not differ with locations as in the flat air bubble layers.

The reflectance $R_S$ of an s polarized light on an interface between an optical material having a refractive index of $n_0$ and another optical material having a refractive index of $n_1$ under the condition of Brewster's angle, is shown by the following equation (1).

$$R_s = (n_1^2 - n_0^2) / (n_1^2 + n_0^2)^2 = (\tan^2\theta_B - 1)^2 / (\tan^2\theta_B + 1)^2 \quad (1)$$

The larger the difference between the refractive indices, the larger the reflectance $R_S$. Therefore, in an approximation (which is sufficiently applicable to this case) not considering multiple reflections between layers, wherein 100% of the p polarized light component in an incident light to the multi-layer structure, is transmitted and x % of the s polarized light component is transmitted, the necessary number of layers N is provided by the following equation (2).

$$N=0.5\times\log(\times/100)/\log(1-R_S) \quad (2)$$

Accordingly, when the multi-layer structure is constructed by a combination of air ($n_1 \approx 1.0$) and a plastics ($n_0 \approx 1.5$), Brewster's angle $\theta_B=56.3°$, $R_S=14.8\%$, the number of layers which is necessary for making the transmittance of the s polarized light component not larger than 2%, is 12.

Therefore, in case of a structure wherein flat air bubble layers are scattered in a homogeneous plastics in a lamellar form, when six or more flat air bubble layers are formed in the depth direction, with respect to a light having substantially an angle of incidence of Brewster's angle, the transmittance of the s polarized light component is not larger than 2% and more than 98% of the component is reflected. On the other hand, the p polarized light component is provided with the transmittance of approximately 100% without the loss of light quantity.

As explained above, the polarization function of the multi-layer structure operates most effectively when the angle of incidence is at Brewster's angle. Accordingly, when the multi-layer structure is provided in the flat illumination device composed of the light source and the flat light guide, it is preferable for the substantial promotion of brightness to provide a construction wherein the angle of incidence of incident light to the multi-layer structure is substantially Brewster's angle, by the means of the light source, the flat light guide and an optical element further added with a light reflecting means and the like.

The reason that the polarized light separator in use of a dielectric film employing light interference works, is as follows. This polarized light separator is provided with a property wherein the transmittance and the reflectance thereof are dependent on the polarization of the angle of oblique incident light, and therefore, it can be employed as a light non-absorbing type polarization element.

When an optical element having a film thickness in the order of a wavelength of visible light and the refractive index of $n_1$ is interposed between an optical material having the refractive index of $n_0$ and another optical material having the refractive index of $n_2$, light will interfere. The angle of incidence and the angle of emittance of light which is incident from the optical material having the refractive index of $n_0$ to the optical material having the refractive index of $n_1$, are determined to be $\theta_0$ and $\theta_1$, respectively. The angle of incidence and the angle of emittance of light which is incident from the optical material having the refractive index of $n_1$ to the optical material having the refractive index of $n_2$, are determined to be $\theta_1$ and $\theta_2$, respectively. The reflection complex amplitude in consideration of the effect of interference when the optical material has the refractive index of $n_1$ and the film thickness is $d_1$, is provided by the following equation (3).

$$\delta=(\rho_a+\rho_b\exp(-2i\delta))/(1+\rho_a.p_b\exp(2i\delta))\ p=2\pi n_1 d_1 \cos\theta_1/\lambda \quad (3)$$

where $\rho_a$ and $\rho_b$ designate amplitude reflectances of Fresnel reflection caused on the interfaces between the optical material having the refractive index of $n_0$ and the optical material having the refractive index of $n_1$, and between the optical material having the refractive index of $n_1$ and the material having the refractive index of $n_2$.

The reflectance is provided by the following equation (4), where $\rho^*$ is the complex conjugation of $\rho$.

$$R = \rho\cdot\rho^* = (\rho_a^2 + \rho_b^2 + 2\rho_e\cdot\rho_b\cos 2\delta)l \quad (4)$$
$$(1 + 2\rho_a\cdot 2\rho_b\cos 2\delta + (\rho_a\cdot\rho_b)^2)$$

The p polarized light component is provided by the following equation (5).

$$\rho_a=(n_0/\cos\theta_0-n_1/\cos\theta_1)/(n_0/\cos\theta_0+n_1/\cos\theta_1)\rho_b=(n_1/\cos\theta_1-n_2/\cos\theta_2)/(n_1/\cos\theta_1+n_2/\cos\theta_2) \quad (5)$$

The s polarized light component is provided by the following equation (6).

$$\rho_a=(n_0.\cos\theta_0-n_1.\cos\theta_1)/(n_0.\cos\theta_0+n_1.\cos\theta_1)\ \rho_b=(n_1.\cos\theta_1-n_2.\cos\theta_2)/(n_1.\cos\theta_1+n_2.\cos\theta_2) \quad (6)$$

From these equation, it is revealed that, when the refractive indices $n_0$ and $n_2$, the refractive index $n_1$ and the film thickness $d_1$ satisfy a certain condition, the ratio of the transmitted light intensity of the p polarized component as compared to the transmitted light intensity of the s polarized light component, increases in comparison with a case wherein there is no interference, at a certain angle of incidence of $\theta_0$. The above equations are concerned with a case wherein the interference film is a single layer. However, the same way of thinking is applicable similarly when the interference film is of a multi-layer.

As stated above, the light emitted from the polarized light separator wherein at least one layer of dielectric films having a thickness of not larger than 1,000 nm, is formed on at least one face of a flat light-transmitting supporter, is provided with high degree of polarization. The film thickness of not larger than 1,000 nm signifies that the thickness is mainly not larger than the order of a visible light wavelength, and it is preferably not larger than 800 nm.

Since the dielectric film of the polarized separator having the thickness of the order of a visible light wavelength, utilizes the light interference, it is generally possible to promote the degree of polarization of a specified wavelength when the number of layers increases, and conversely, the wavelength dependency also increases. When the spectrum of the employed backlight light source is of a narrow band wavelength, it is possible to construct a multi-layer film wherein the degree of polarization increases with respect to the backlight wavelength range of light. However, a film having too many layers causes a poor productivity. Therefore, the number of layers is preferably 5 through 15. On the other hand, when a white backlight is employed for color display, it is preferable to employ an interference film having not larger than 5 layers, especially a single layer, to restrain the wavelength dependency of the degree of polarization to a low value. It is preferable to form a single layer film of $TiO_2$ or $ZrO_2$ since a flat degree of polarization is provided over the whole region of visible light and it is easy to control the film thickness, although a high degree of polarization can not be provided.

The material of the flat light-transmitting supporter employed in the polarized light separator is glass or plastics such as acrylic resin, polycarbonate, polyurethane, polystyrene and the like. It is preferable that the material is light and surface thereof is smooth.

As a material of a dielectric film, $TiO_2$, $ZrO_2$, ZnS, $Y_2O_3$, $SiO_2$, $MgF_2$, $Na_3AlF_6$, $Ta_2O_5$ and the like, are pointed out. The refractive indices of these dielectric films are normally in a range of 1.4 through 2.5, and the film formation may be performed by selecting dielectric films having pertinent refractive indices. Further, the film forming can be performed by normally employed methods such as vapor deposition, sputtering, and the like.

Further, the polarized light separator of the invention can be formed by laminating plural kinds of transparent polymer layers having different refractive indices. Also in this case, as in the above-mentioned multi-layer structure or the dielectric thin film, it operates as a light non-absorbing polarized light separator.

The polarized separator can be formed by a multi-layer film construction whereby the degree of polarization is promoted with respect to the wavelength range of the backlight. Since the film having too many layers causes the poor productivity, the number of layers is preferably not smaller than 30, more preferably 100 through 400. It is preferable that the materials of the light-transmitting polymers having different refractive indices are suitable for forming a multi-layer laminated body. Further, the larger the difference in the refractive indices, the more preferable.

It is preferable that the materials of the transparent polymers are selected from at least two of plastics such acrylic resin, polycarbonate resin, polyurethane, polystyrene, triacetyl cellulose, polymethylpentene, polyether sulfone and the like. Further, it is preferable that the difference in the refractive indices is not less than 0.03, to improve the efficiency.

A consideration should be given to the method of making the polarized light separator in the above selection. Although there are the casting method, the multi-layer extrusion method and the like as the method of manufacturing the multi-layer laminated product, it is preferable to adopt the multi-layer extrusion method whereby a multi-layer film having not less than 30 layers can economically formed.

The method of manufacturing is disclosed in U.S. Pat. No. 3,773,882 and U.S. Pat. No. [3,883,606] *3,884,606*. In case of a polarized separator having a thickness enough to decrease the interference operation of light, the total thickness increases. Accordingly, when the interference of light is used, the optical thickness of at least one of polymers having different refractive indices, is not less than 0.05 $\mu$m and not more than 0.45 $\mu$m. Further, the thicknesses of both polymers are considerably different rather than almost equal, since a so-called nacreous color due to the variation in the thicknesses of the respective layers, is not manifested. Further, a hard coat layer of silicone and the like may be provided on the surface.

Figure 4:
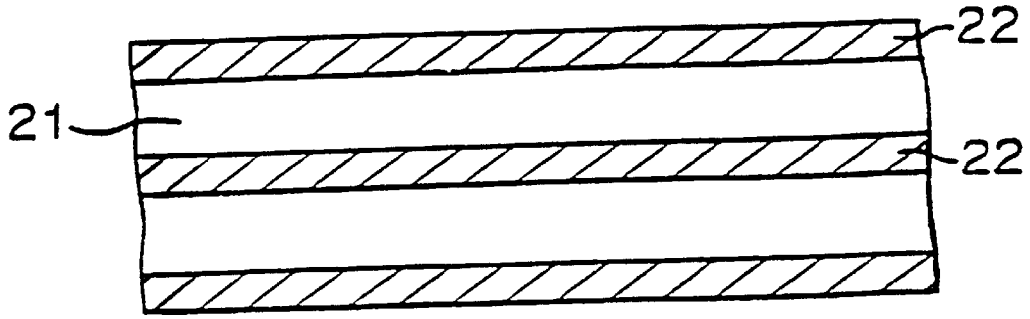
FIG. 4 is a sectional diagram showing a construction of a polarized light separator employed in this invention.
Figure 5A:
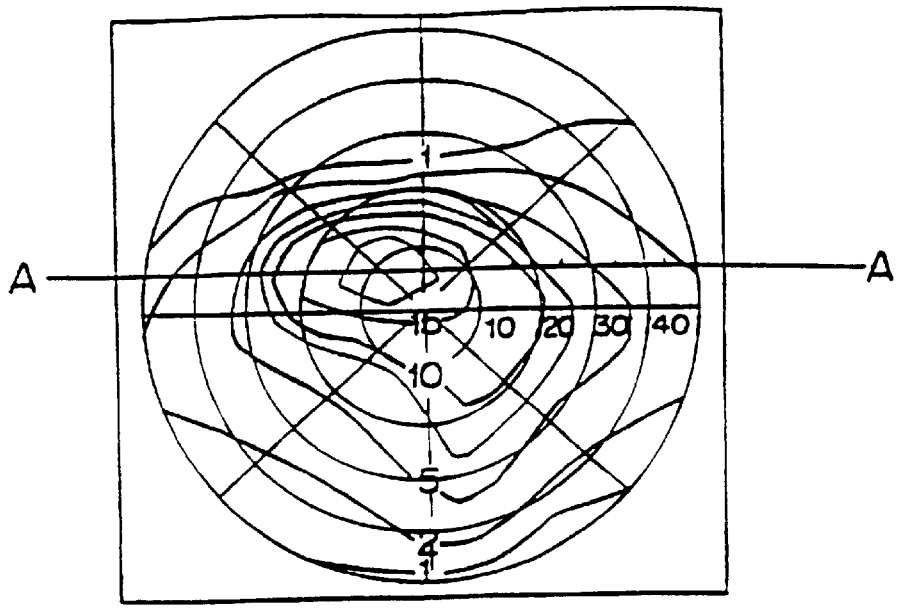
FIG. 5 is a graph showing a contrast ratio curve of an STN liquid crystal display element.
Figure 5B:
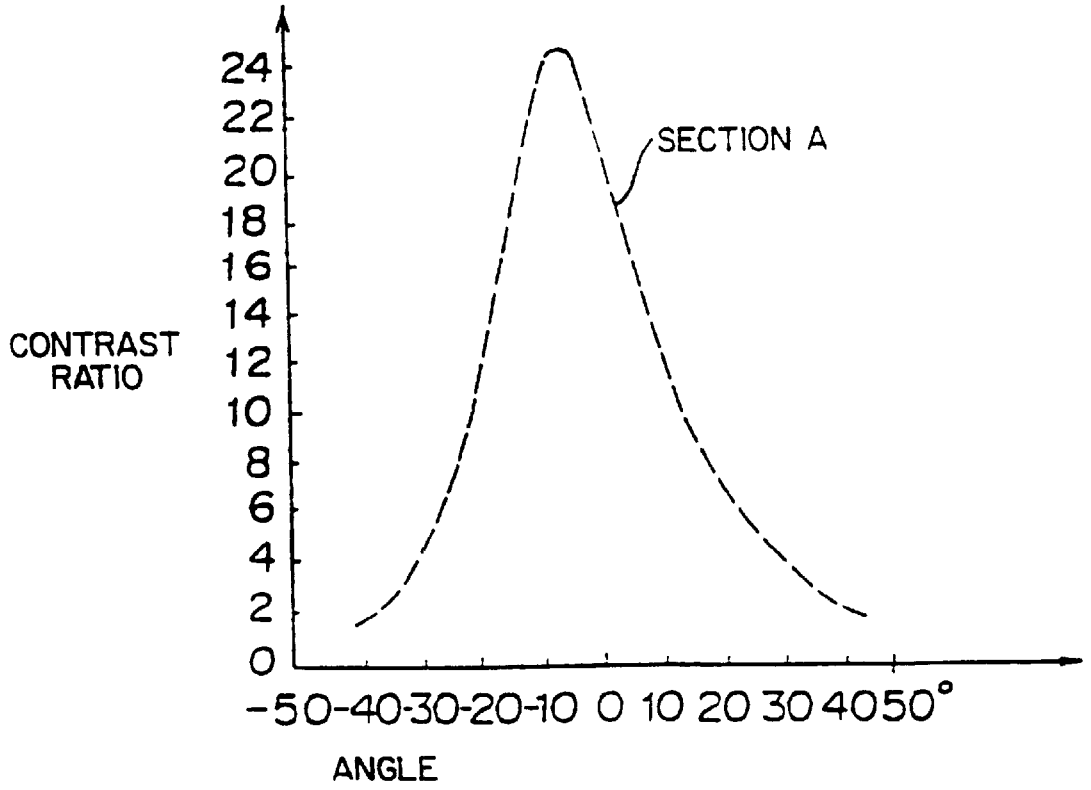

FIG. 4 is an outline sectional diagram of a polarized separator which employs the interference of light. First polymer layers 21 and second polymer layers 22 are alternately laminated, and at least the second polymer layers 22 are provided with a thickness which is enough to cause the interference of light.

The examples of preferable combinations of preferable polymers in consideration of the method of manufacturing, are acrylic resin and polycarbonate, acrylic resin and polystyrene, polymethylpentene and polycarbonate and the like.

A detailed explanation will be given of a liquid crystal display device of this invention using FIG. 1 which is a representative construction diagram, as follows.

A fluorescent lamp 1 (cold cathode fluorescent lamp) having a length corresponding to a length of a side face of a light guide 3, is attached to the side of the light guide 3 (an acrylic resin plate) which is transparent and which is an illuminating sheet, and a lamp cover having a reflecting body on the innerface thereof, is provided thereby introducing a light emitted from the lamp into the light guide 3.

As stated above, in case of using an illumination device in a direct viewing type liquid crystal display element, the light distribution property of the illumination light is extremely important. The directivity (angular distribution) of the light transmitting through the light guide 3, is determined by the light direction distributing property of the fluorescent lamp, the light gathering property of the reflecting body, the light transferring property of the light guiding plate and the like. Further, in the light transferring property of the light guide, the functions of sending the light incident on an edge portion of the light guide to the inside of the light guide, and the function of emitting the transmitted light to a predetermined direction, are important.

The function of sending the light which is incident on the edge portion of the light guide to the inside of the light guide, is determined in accordance with the material employed in the light guide and the interface reflecting property. That is to say, on the side of the liquid crystal display element 12 of the light guide 3, the light having the angle of incidence which is not smaller than the total reflection angle $\theta_c$ which is determined by the refractive index of the light guide 3, is totally reflected and transmitted through the light guide 3, and light having the angle of incidence which is below the total reflection angle $\theta_c$, is refracted on the surface of the light guide 3 and emitted on the side of the liquid crystal display element 12. For instance, the total reflection angle $\theta_c$ on the interface of air ($n \approx 1.0$) and a transparent plastics (for example, $n \approx 1.5$), is determined by the following equation (7), and the incident light having the angle of incidence of not more than 42.2° can emit from the illumination plane of the light guide 3.

$$\theta_c = \sin^{-1}(1/n) = 42.2° \quad (7)$$

As a preferable transparent resin employed in the light guide, for instance, acrylic resin, polycarbonate, polyurethane, polystyrene, silicone and the like are pointed out.

When a reflecting plane 5 such as an aluminum reflecting plane is formed on a face opposite to the liquid crystal display element of the light guide, the reflected light is guided to the inside of the light guide. Further, the reflecting plane 5 may be a diffused reflection plane to increase light emitted from the face on the side of the liquid crystal display element 12 of the light guide 3.

On the other hand, when most of light which is incident on the light guide 3 is provided with the angle of incidence which is not smaller than the total reflection angle $\theta_c$, the light emitted from the light guide is very little. Therefore, it is necessary to provide a function wherein the light is emitted on the side of the liquid crystal display element 12 of the light guide 3 by avoiding the total reflection condition. As the means of avoiding the total reflection condition, there is a method such as a method of forming a white light diffusing material on the surface of the light guide 3, a method of forming a Fresnel shape (microlens array, prism array and the like) having a lenticular or a prism shape on the surface of the light guide.

The Fresnel shape in this case, may be formed on a face of the light guide on the side of the liquid crystal display element 12, or may be formed on the opposite side. Further, a film-like plate having a Fresnel shape may be placed on the face of the light guide. When it is placed on the light guide, it is necessary that an air layer is not present between the film and the light guide. Therefore, it is preferable that a deaeration is performed after pasting the film, or the film is pasted by employing an adhesive agent having the refractive index which is comparable to that of the film. Further, it is preferable that the refractive index of the film is approximately the same with that of the light guide.

The polarized light separator employed in this invention manifests a strong polarized light separating function with respect to light having the angle of incidence (Brewster's angle) in a specified range. Therefore, it is preferable that the angle of light incident on the polarized light separator is provided with a maximum value at Brewster's angle of the polarized light separator, and the light quantity is substantially concentrated on Brewster's angle, to promote the illuminance. Accordingly, it is important to control the angle of light emitted from the light guide.

To control the angle of emittance, the distribution of the white light diffusing material, the Fresnel shape, (microlens array, prism array and the like) with a lenticular or a prism, and the like are adjusted. For instance, by placing a film of a prism array 13 (see FIG. 2), made by a component which is the same with that of the light guide, on the surface of the light guide, the maximum of intensity of light emitted from the light guide is concentrated in a deviated range of +40° through +80° and −40° through −80°.

Specifically, when a multi-layer structure wherein flat air bubble layers are dispersed in a lamellar form, as above, is formed, Brewster's angle $\theta_b$ on the interface between the acrylic resin and the air bubble layer is 33.7° according to the equation (1). Therefore, only the p polarized light component is emitted on the side of the liquid crystal display element 12, by optimizing the light direction distributing property of a fluorescent lamp, the light gathering property of the light reflector, the light transferring property of the light guiding plane and the like, such that the incident light from the acrylic resin side to the multi-layer structure is substantially 33.7°. On the other hand, the s polarized light component is transmitted through the light guide 3 as in the case of total reflection. Further, the polarization characteristic of this polarized light separator 6 is an effect which is sufficiently manifested even when the incident light is a little deviated from the Brewster's angle condition. In this case, the polarized light separating operation is significant even with respect to a light ray having the angle of incidence of 20° through 40° which is proximate to the total reflection angle, although the light extinguishing ratios of the s and p polarized light components are a little deteriorated.

The directivity of light emitted from the polarized light separator, is not necessarily distributed in the viewing angle of an observer of the liquid crystal display element, that is, in a direction orthogonal to a face of the liquid crystal display element. Rather, in an ordinary case, the direction of emittance of light which is incident on the polarized light separator by the angle of incidence proximate to Brewster's angle, concentrates in a range out of viewing angle. For instance, the direction of emittance concentrates in the ranges of −40° through −70° and 40° through 70° with respect to the vertical direction of the face of the liquid crystal display element, in a plane including an optical axis of light transferring through the light guide, and the light which reaches the viewing angle range of an observer is very little. Therefore, a clear display is not provided.

Figure 1:
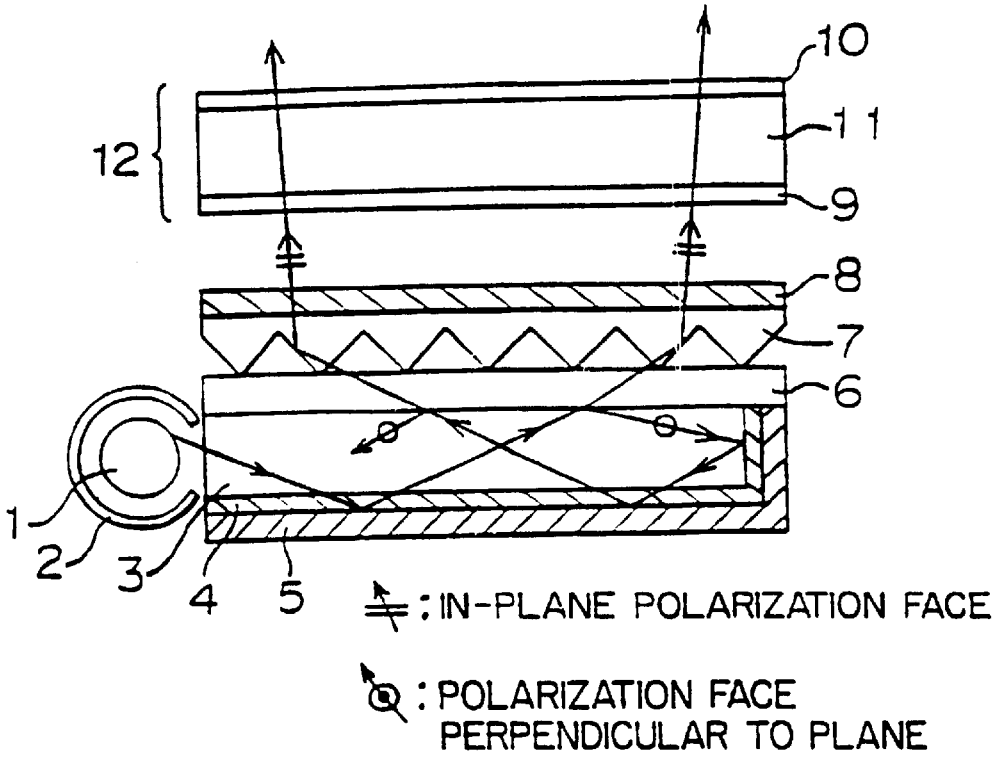
FIG. 1 is a sectional digram showing an example of the present invention.

For instance, in FIG. 1, in case wherein the incident light from the side of the acrylic resin to the multi-layer structure is provided with the angle of incidence of 33.7°, the angle of emittance of the multi-layer structure is $\sin^{-1}$, ((sin 33.7°)/n)=56.3°. To convert the light direction distribution of the flat illumination device having the light direction distribution in the deviated viewing angle plane (±40° through ±70°), to the direction perpendicular to the illuminating plane, it is effective to further provide a light deflector on the side of the light emittance of the polarized light separator. As the light deflector, a microlens array or prism array or the like having a lenticular shape or Fresnel shape can be employed.

FIG. 1 shows a case wherein a prism array having Fresnel shape on the surface is disposed between the light guide 3 laminated with the polarized light separator 6 and a polarizing sheet 9 on the light-incident side of the liquid crystal display element 12 with the prism face in parallel with the progressing direction of light transferring in the light guide 3. The prism array 7 is of a columnar prism, the intersection including an average optical axis of light ray emitted from the flat light guide 3 is triangular. With respect to the prism array 7, in accordance with the shape and arrangement (whether the apex of prism is on the light-incident side or light-emitting side), there is a case wherein the refraction is caused on the light-incident face and the light-emitting face of the prism, and a case wherein the total reflection is caused, and the orientation of the light direction distribution of the emitting light can be controlled. The optimum shape and arrangement may be determined by a finally necessary orientation of the light direction distribution and the orientation of the light direction distribution of the light emitted from the polarized light separator.

For instance, a prism array 7 having a sectional shape of an isosceless triangle having the apex angle of approximately 60° is employed and is arranged such that the apex faces the face of the polarized light separator. In this case, the light emitted from the polarized light separator by the angle of the emittance which is substantially equal to 60°, is incident on a side face of the prism, and totally reflected by the other side face, and thereafter, emitted from the bottom face of the prism corresponding to the perpendicular incident direction on the side of the liquid crystal display element. Therefore, it is possible to convert the light direction of the light emitted from the polarized light separator with the angle of emittance of substantially 60°, to the light direction having the direction perpendicular to the face of the liquid crystal display element.

In this way, a linearly polarized light flat illumination device which illuminates the liquid crystal display element in the perpendicular light direction distribution, is provided. When the directivity of the light transferring through the light guide, is large, as a result, the light direction distribution of the light emitted from the flat illumination device concentrates on the perpendicular direction, and the range of viewing angle which corresponds to a clear display, is too narrow. In this case, it is possible to dispose an optical element such as a light diffusing sheet 8 which deteriorates the directivity, between the liquid crystal display element and the light deflecting means such as the above prism array.

Further, the reflecting face 5 formed on the face opposite to the liquid crystal display element of the light guide, may be converted into a light diffusing plane, to deteriorate the directivity of light transferring in the light guide. Further, the polarized light separator per se may be provided with a fine rugged structure such that the light scattering is caused on the interface of the structure. In case of the polarized light separator having a construction wherein flat air bubble layers are scattered in a homogeneous plastics in a lamellar form, as mentioned above, the shape of the interface of the air bubble layer is random, and the fine rugged structure is easy to cause. Therefore, the light diffusing effect is easy to manifest simultaneously.

In FIG. 1, a case is shown wherein the multi-layered structure is formed on the surface of the light guide. However, it is not necessary to form the multi-layered structure on the surface of the light guide, and the multi-layered structure may be disposed inside the light guide.

It is important in this invention to convert the s polarized light which is reflected and returned to the inside of the light guide in the multi-layer structure, to a light including the p polarized light component in efficiently transferring it in the light guide, and reuse it, to efficiently provide the linearly polarized light from the flat illumination device. There are various methods to convert the s polarized light to a light including the p polarized light component. The representative examples are described as follows.

Generally, it is known that, in case wherein a linearly polarized light is incident on a metal face in a oblique direction and is reflected, the linearly polarized light is converted into an elliptically polarized light in accordance with the optical physical constants (refractive index n, absorption coefficient k) of a metal. That is, even when the s polarized light is incident, a p polarized light component is formed in the reflecting light. Accordingly, when the reflecting plane 5 formed on a face of the light guide 3 opposite to the liquid crystal display element 12 is of a metal such as aluminum in this invention, a portion of the s polarized light is converted into the p polarized light, every time the light is reflected by this reflecting plane. As another method, there is a method wherein a phase difference plate composed of a transparent [high] polymer material, is employed. For instance, by disposing the phase shift plate having a pertinent film thickness, is disposed between the reflecting plane 5 of the light guide 3 and the polarized light separator 6, the s polarized light reflected by the polarized light separator becomes an elliptically polarized light and a portion thereof can be converted into the p polarized light. FIG. 1 shows an Example of a construction wherein the polarized light conversion is efficiently performed by attaching the phase shift sheet 4 on the reflecting plane 5 provided on the light guide 3. Further, the phase shift sheet 4 may be disposed between the polarized light separator 6 and the light guide 3.

Figure 2:
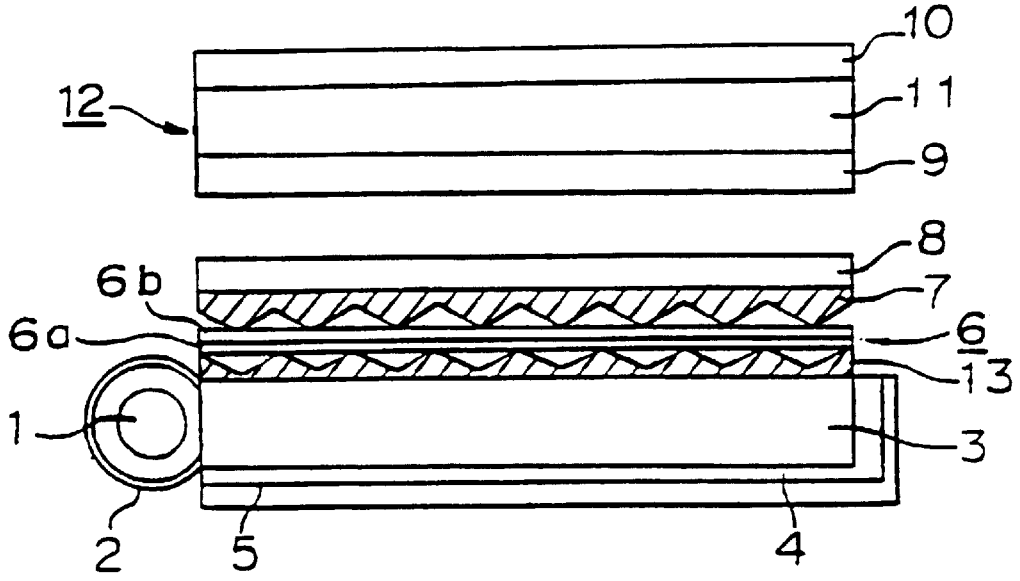
FIG. 2 is a sectional diagram showing another example of the present invention.

FIG. 2 shows an example wherein a polarized light separator in which one layer of a dielectric film is formed on one face of a flat transparent supporter, is employed, and a prism array 13 for emitting light to the liquid crystal display element avoiding the total reflection condition of the light guide. A notation 6a designates a flat light-transmitting supporter, and 6b, a dielectric film. Since the other construction is almost the same as in FIG. 1, parts of FIG. 2 which are the same with those in FIG. 1 are attached with the same notations, and the explanation will be omitted.

As stated above, the polarized light separator may be of a component which is different from the light guide. However, it may be of a single component. For instance, a polarized light separating layer such as a dielectric body interference film may be formed on the light guide. The respective interfaces among the light guide, the outside of the light guide and the dielectric body interference film achieve an effect which is similar to that of the polarized light separator. In case wherein the structure of the light guide is formed into a prism array or the like, to enhance or to make uniform the light quantity of light emitted from the light guide, the dielectric interference film may be formed on the surface having a prism array shape.

Figure 3:
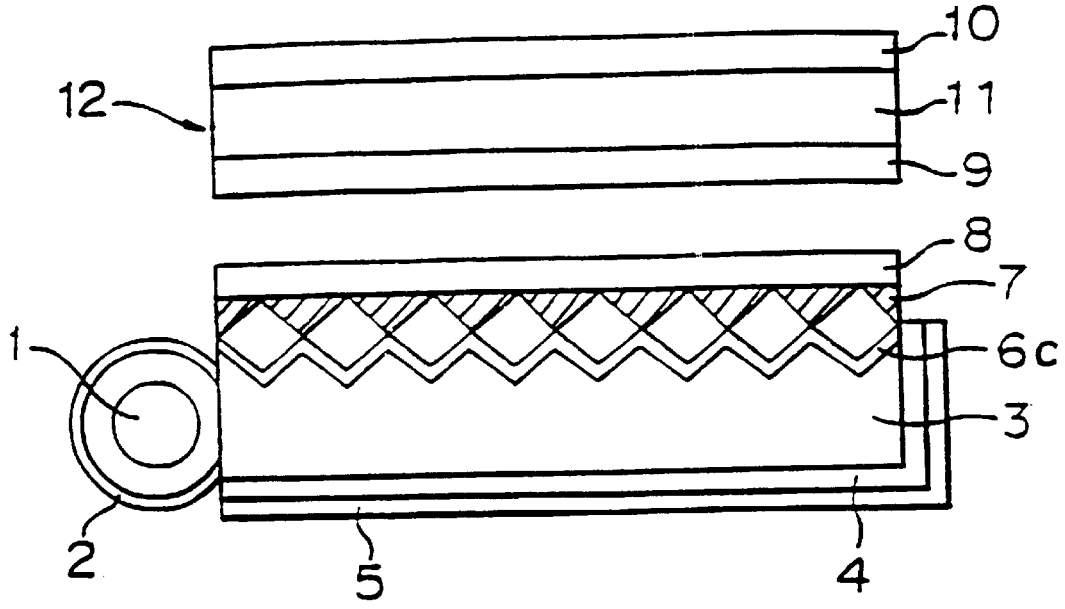
FIG. 3 is a sectional diagram showing another example of the present invention.

Such an example is shown i n FIG. 3. A prism array shape is formed on the surface of the light guide 3, and a dielectric film 6c is further formed on the surface of the prism array. A polarized light separation function is manifested on the interface between the light guide and the dielectric film. Since the other construction is approximately the same as in FIG. 1, parts of FIG. 3 which are the same with those in FIG. 1 are attached with the same notation, and the explanation will be omitted.

To maximize the quantity of light which transmits through a liquid crystal panel, the direction of the optical axis of polarization of the polarizing plate of the liquid crystal panel on the side of the polarized light separator, should coincide with the direction of an optical axis of polarization of light emitted from the polarized light separator. However, the optical axis of polarization of light emitted from the polarized light separator, is dependent on the position of the light source disposed on the side portion of the flat light guide. For instance, in case of FIG. 1, light is emitted which is polarized in the direction perpendicular to the linear light source. On the other hand, thee is a direction wherein the contrast ratio is high, and a direction wherein the contrast ratio is low depending on the viewing angle, in the liquid crystal panel. Normally, the liquid crystal panel is designed such that the contrast ratio is maximized in the direction of viewing the liquid crystal panel. This viewing angle is influenced by the angle of the optical axis of the polarization of the polarizing plate. Accordingly, when the angle of the optical axis of polarization of the polarizing plate of the liquid crystal panel on the side of the polarized light separator, suffers a restriction, the direction of the viewing angle can not freely be determined.

It is possible to provide an optical axis of polarization rotating means between the illumination device and the display device in this invention, to cope with such a case.

Generally, the rotation of the optical axis of polarization of light, is caused in case wherein light transmits through a medium having the birefringence, or wherein light transmits through a medium having the optical rotating power. The optical axis of polarization is rotated when media having the birefringence are laminated in multi-layers which rotates the optical axis.

Especially, when a linearly polarized light is incident on a medium having the birefringence, an elliptically polarized light is emitted therefrom. The ellipticity and the direction of the long axis of ellipse are determined by the amount of birefringence and the direction of optical axis of the birefringence medium. However, when a linearly polarized light is incident on a substrate having the birefringence the amount of which is a half of the wavelength λ of the incident light, the emitted light is always a linearly polarized light. Further, when a medium having the birefringence of λ/2 is provided with an advanced phase axis direction which is inclined by θ with respect to the direction of the optical axis of polarization of the incident linearly polarized light, the linearly polarized light is emitted inclined by 2θ with respect to the direction of the optical axis of the polarization of the incident linearly polarized light.

It is possible to convert the optical axis of polarization of a linearly polarized light which is polarized in an arbitrarily direction, to a specified direction while the linearly polarized light remains as it is, by utilizing the above property.

The region of wavelength required for a liquid crystal display device is that of all the visible light, and the property of the illumination light is considerably different by a selection of wavelength whereby the amount of the birefringence of plate is determined. As the λ/2 plate, it is preferable to employ a flat film, judging from the aspects of the light-weightedness, the thinness, the cost and the like. Since there is no film which satisfies the condition of λ/2 with respect to all the visible light, it is preferable to generally employ a film satisfying the condition of λ/2 at a wavelength approximately equals to 550 nm wherein the viewing sensitivity is maximized. That is, the film is provided with the birefringence in the vicinity of the wavelength of 275 nm.

The quantity of birefringence λ/2 of the optical axis of polarization rotator signifies a quantity along a locus of a light ray. The direction wherein a light ray maximizing the light quantity transmits through the optical axis of a polarization rotating means, is not always in the direction perpendicular to a flat sheet of the optical axis of polarization rotating means. It is preferable to design the setting of the size of birefringence of the film, optimally in consideration of the locus of light rays maximizing the light quantity.

As the material of the film, polyvinyl alcohol, polycarbonate, polystyrene, polymethyl methacrylate and the like, are employed.

The birefringence of the film is generally provided by an uniaxial elongation. That is, a difference of refractive indices between a direction of an orientated axis and a direction perpendicular to the orientated axis is caused by the uniaxial elongation. The birefringence is caused in direction of thickness, and the ellipsoid of the refractive index is uniaxial.

Further, it is effective in the construction of this invention in a viewpoint of making uniform the illumination to further provide a uniform light forming means. There is a case with respect to light emitted to the edge light type backlight, wherein the larger the distance from the light source, the smaller the light quantity. This is not preferable in a case wherein the edge light type backlight is employed as an illumination device for display elements of a large image area. Accordingly, a means is provided which makes uniform an in-plane intensity distribution of light emitted from a flat light guide. In other words, the further the emitting light is disposed from a light source, the better a light emitting efficiency of light emitted from the flat light guide.

The uniform light forming means may be provided on both surfaces of the flat light guide, or on one side thereof. The design of the uniform light forming means for making uniform the emitted light, is considerably dependent on whether the light source is disposed only on one side of the flat light guide or on both sides.

A light diffusing means can be employed as one of the uniform light forming means. When the light source is disposed on one side of the flat light guide, it is preferable that the light diffusing effect is small on the side of the light source, and the further from the light source, the more improved is the light diffusing effect. However, a light reflecting means is normally provided on a side face of the light guide opposite to the light source, it is preferable that the diffusing effect is a little improved on the side of the light source, in the vicinity of the side face of the light guide opposite to the light source. When light sources are disposed on the both sides of the flat light guide, it is preferable that the diffusing effect at the central portion is large.

It is simple and effective for controlling the diffusing effect to perform a mesh printing of a white ink on the light guide and control the size or the density of the mesh. However, the use of the light diffusing material has a possibility of deteriorating the directivity of light emitted from the uniform light forming means, and may reduce an incident light having Brewster's angle which is suitable for the polarized light separator to separate the s polarized light component and the p polarized light component. Therefore, it is more preferable if the uniform formation of light is achieved by a means other than the light diffusing means.

As a uniform light forming means other than the light diffusing means, a means can be employed wherein a lenticular shape is formed on the surface of the flat light guide. When the light source is disposed only on one side of the flat light guide, it is preferable that the light emitting efficiency on the side of the light source is low, and the further the emitted light is disposed from the light source, the more improved the light emitting efficiency. Further, in case wherein a reflecting means is disposed on a side face of the light guide opposing the light source, it is preferable that the light emitting efficiency is more improved on the side of the light source, in the vicinity of the side face of the light guide opposing the light source. In case wherein the light sources are provided on the both sides of the flat light guide, it is preferable that the light emitting efficiency is large at the central portion.

There are means for controlling the light emitting efficiency of the lenticular lens which are schematically shown in FIGS. 8(a) through 8(d). In these Figures a numeral 61 designates a light source, 62, a reflecting plate, and 63, a flat light guide.

FIG. 8(a) shows an example wherein the distribution of arcs is changed. FIG. 8(b) shows an example wherein the heights h of arcs are changed. FIG. 8(c) shows an example wherein the heights and the widths of arcs are changed. FIG. 8(d) shows an example wherein aspect ratios of portions of ellipses are changed. Naturally, these curves can be employed in combinations.

Further, as a uniform light forming means, a means can be employed wherein a prism shape is formed on the surface of the flat light guide. In case wherein the light source is disposed only on one side of the flat light guide, it is preferable that the light emitting efficiency is low on the side of the light source, and the further the emitted light is disposed from the light source, the more improved is the light emitting efficiency. In case wherein a reflecting means is provided on the side face of the light guide opposing the light source, it is preferable that the light emitting efficiency is more improved on the side of the light source, in the vicinity of the side face of the light guide opposing the light source. In case wherein the light sources are provided on the both sides of the flat light guide, it is preferable that the light emitting efficiency is large at the central portion.

There are means for controlling the light emitting efficiency of a prism array, which are extremely schematically shown in FIGS. 9(a) and 9(b). In these Figures, a numeral 61 designates the light source, 62, the reflecting plate, and 63, a flat light guide.

FIG. 9(a) shows an example wherein the distribution of prisms is changed. FIG. 9(b) shows an example wherein the heights of prisms are changed. Naturally, these can be employed in combinations. Further, prisms and lenticular lenses may be employed.

The pitch of a prism or lenticular lens is preferably selected from a range of 0.1 through 1 mm, since it is conspicuous when it is large and it is hard to manufacture when it is fine.

Although such a uniform light forming means may be provided separately from the light guide, it is generally preferable to integrate it with the light guide, in view of reducing the number of parts.

EXAMPLES 1 to 3

An explanation will be given of Examples of this invention in reference to FIG. 1.

In an edge light type backlight wherein a fluorescent lamp 1 (cold cathode fluorescence lamp) attached to one side of a transparent acrylic resin flat light guide 3 which is an illumination plane, light is introduced into the light guide by providing a lamp cover 2 composed of a light reflecting body, and a polarized light separator 6 composed of a multi-layered structure is integrated.

As the fluorescent lamp 1, a cold cathode fluorescence lamp of 10 W or 16 W having a length corresponding to a side face length (152 mm) of a 10 inch liquid crystal display plane and a small tube diameter are used. Further, as the lamp cover 2, a reflecting mirror having a cylindrical shape or an elliptic column shape surrounding the cold cathode fluorescence lamp is employed and as the light guide 3, a light-transmitting light guiding plate (n=1.49) made of an acrylic resin and having a size of 160 mm×220 mm×5 mm, is employed. Further, a retardation plate 4 is provided on the backface of the light guide 3 and a side face of the light guide opposing the face wherein the fluorescent lamp is disposed, and a reflecting plane composed of an aluminum metal reflecting film is formed thereon.

As a multi-layered structure of a polarized light separator 6, a structure is adopted wherein approximately five layers of flat air bubble layers having a height in the thickness direction of about 10 $\mu$m and a radius of about several mm, are dispersed in a homogeneous transparent plastic plate (n≈1.5), in a lamellar form, and the structure is attached on the side of the light emitting plane of the light guide 3.

Further, as a prism array 7, a prism array each prism having a sectional shape of an isosceless triangle having the apex angle of 58°, is employed, and is disposed such that the apex faces the polarized light separator 6. The thickness of the prism array plate is 2 mm and the pitch of the prism array is about 1 mm. Further, a light diffusing plate 8 is employed on the side of the light emitting face of the prism array 7, to widen the viewing angle.

As a liquid crystal cell 11, an RGB color TFT driving TN liquid crystal display cell having the pixel number corresponding to VGA, is employed.

As a light-incident side polarizing sheet 9, a normal light absorbing type organic polarized plate is employed. When the required contrast ratio is approximately 10:1, there is a case wherein the above polarizing sheet is not employed and only the above-mentioned multi-layered structure is employed. However, in this case, since the light distinguishing ratio of a polarized light is low (about 10:1; about 1,000:1 in case of the light absorbing type organic polarizing plate), it is necessary to provide the incident-side polarizing sheet, in a TFT driving liquid crystal cell television set wherein a contrast ratio of not smaller than 100:1 is required. With respect to the optical axis of polarization of the light absorbing type organic polarizing sheet, the optical axis of polarization of light emitted from the polarized light separator 6 and the optical axis of polarization of the polarizing sheet 9 agree with each other such that the p polarized light emitted from the multi-layer structure is provided with the maximum transmittance.

A light-emitting side polarizing sheet 10 similarly employs a light-absorbing type organic polarizing sheet. The direction of the optical axis of polarization is suitably selected in accordance with the display mode (normally white, normally black). However, in this Example, as the normally white display, the optical axis of polarization of the light-emitting side polarizing sheet 10 is provided in the direction wherein the optical axis of polarization is rotated by 90° with respect to the optical axis of polarization of the light-incident polarizing sheet 9.

Examples 1 through 3 were carried out by adjusting the power consumption of the lamp and the brightness of a viewing field in the perpendicular direction, by variously changing the properties of the light source and the light guide. Table 1 shows these Examples and a Conventional Example.

TABLE 1

| | Power consumption of lamp | Brightness of perpendicular viewing field | Range of viewing angle at ½ maximum brightness | |
|---|---|---|---|---|
| | (W) | (cd/m$^2$) | Horizontal | Vertical |
| Conventional | 16 | 100 | ±50° | ±40° |
| Example 1 | 16 | 150 | ±50° | ±40° |
| Example 2 | 10 | 100 | ±50° | ±40° |
| Example 3 | 16 | 100 | ±60° | ±40° |

In Example 1, the brightness was improved by 1.5 times as much as that of the conventional Example, and the viewing angle range was not narrowed. In Example 2, both the brightness and the viewing angle were approximately the same as in the conventional Example, however, the power consumption of lamp was reduced to ⅔ of that in the conventional case, and the time for driving a battery was prolonged. In Example 3, the power consumption of lamp and the brightness of the perpendicular viewing field were the same as those in the Conventional Example, but the viewing angle was widened.

In this way, various light direction distribution can be provided in accordance with the contrast ratio of an employed liquid crystal display element. Especially, it is possible to selectively enhance the brightness of the perpendicular viewing field.

EXAMPLES 4 to 6

An explanation will be given of other examples of this invention in reference to FIG. 2.

An edge light type backlight is employed wherein a fluorescent lamp 1 (CCFL) is attached to a side of a transparent acrylic resin plate light guide 3 which is an illumination plane, and light is introduced to the light guide by providing a lamp cover 2 which is composed of a light reflecting body.

As the fluorescent lamp 1, CCFL of 2 W and 4 W are employed which are provided with a length corresponding to a side face length (120 mm) of a general notebook type personal computer. Further, as a lamp cover 2, a reflecting mirror having a cylindrical shape or an elliptic column shape surrounding the cold cathode discharge tube, is employed, and as the light guide 3, a transparent light guiding plate (n=1.49)is employed which is made of an acrylic resin and is provided with a size of 128 mm×225 mm×2.8 mm.

Further, a retardation plate 4 is provided on the backface of the light guide 3 and a side face of the light guide opposing the fluorescent lamp, on which a reflecting face composed of an aluminum metal reflecting film is formed. The retardation plate is a ¼ wavelength plate.

As a prism array 13, a prism array each prism having a sectional shape of an isosceless triangle having the apex angle of 160°, is employed, and is disposed such that the apex faces the polarized light separator 6. The thickness of the prism array plate is 2 mm and the pitch of the prism array is approximately 1 mm. The prism array 13 and the light guide 3 employ an acrylic resin of the same material. Further, an optical adhesive agent having the refractive index of 1.49 which is the same with that of the acrylic resin, is employed between the prism array 13 and the light guide 3.

As a polarized light separator 6, one layer of a titanium oxide ($TiO_2$:n=2.35) film 6a is formed on the surface of a homogeneous glass substrate (n=1.52) 6b by the film thickness of approximately 640 Å, and is provided on the light-emitting plane side of the light guide 3. The light separating angle of the polarized light separator is approximately 72°.

Further, as a prism array 7, a prism array each prism having the sectional shape of an isosceless triangle having the apex angel of 60°, is employed, and is disposed such that the apex faces the polarized light separator 6. The thickness of the prism array is 2 mm and the pitch of the prism array is approximately 1 mm. Further, a light diffusing plate 8 is employed on the light-emitting face side of the prism array 7 to widen the viewing angle.

As a liquid crystal display element 12, an STN liquid crystal display cell of a monochromatic display wherein films having the birefringence are laminated, is employed. The twist angle is 240°.

As alight-incident side polarizing sheet 9, a normal light absorbing type organic polarizing sheet is employed. With respect to the optical axis of polarization of the light-absorbing type organic polarizing sheet, the optical axis of polarization of light emitted from the polarized light separator 6 and the optical axis of polarization of the polarizing sheet 9 agree with each other, such that the p polarized light emitted from the polarized light separator is provided with the maximum transmittance.

A light-emitting side polarizing sheet 10 similarly employs the light absorbing type organic polarizing sheet. Although the direction of the optical axis of polarization is pertinently selected, in this Example, the optical axis of polarization of the light-emitting side polarizing sheet 10 is in the direction wherein the optical axis of polarization is rotated by 85° with respect to the optical axis of the polarization of the light-incident side polarizing sheet 9.

Examples 4 to 6 were carried out by adjusting the power consumption of the lamp and the brightness of the perpendicular viewing field, by variously changing the properties of the light source and the light guide. Table 2 shows a comparison between the Examples and a Conventional Example having no polarized light separator.

TABLE 2

| | Power consumption of lamp | Brightness of perpendicular viewing field | Range of viewing angle at ½ maximum brightness | |
|---|---|---|---|---|
| | (W) | (cd/m$^2$) | Horizontal | Vertical |
| Conventional | 2 | 60 | ±50° | ±20° |
| Example 4 | 2 | 90 | ±50° | ±20° |
| Example 5 | 1.3 | 60 | ±50° | ±20° |
| Example 6 | 2 | 60 | ±60° | ±30° |

In Example 4, the brightness was improved by 1.5 times as large as that in the Conventional Example, and the viewing angle range was not narrowed down. In Example 5, both of brightness and the viewing angle were approximately the same as in the Conventional Example, but the power consumption of the lamp was reduced by ⅔ of that in he conventional Example, and the time for driving a battery was prolonged. In Example 6, both the power consumption of the lamp and the perpendicular brightness were the same as those in the conventional Example, but the viewing angle was widened.

In this way, various light direction distributions can be provided in accordance with the contrast ratio curve of the employed liquid crystal display element. Especially it is possible to selectively enhance the brightness of the perpendicular viewing field.

EXAMPLE 7

An explanation will be given of an Example in reference to FIG. 3. The shape of the surface of a light guide 3 is in a prism array shape. Three layers of thin films of $ZrO_2$ and $SIO_2$ are alternately and uniformly formed on the surface. Specifically, the three layers are formed on the light guide in the order of $ZrO_2$, $SiO_2$ and $ZrO_2$, and the degree of polarization at Brewster's angle is maximized in the vicinity of the wavelength of 530 nm. The light guide and the dielectric interference film are integrated. The apex angle of the prism array of the light guide 3 is 160°. Since the direction of light emitted from the dielectric body interference film is provided with a distribution with respect to the direction perpendicular to the face of the light guide, a prism array is further provided on the side opposite to the light guide of which apex of each prism faces the light guide. The construction other than the above is the same as in Example 4. The brightness a little increases compared with that in Example 1. This is because the interface reflection is reduced since the interface is reduced in Example 7. Further, the thickness can be reduced compared with that in Example 4 by the integral forming. Further, there is a merit wherein the cost is reduced in the mass production.

EXAMPLE 8

As a polarized light separator, a laminated product having the same shape as in FIG. 2 is employed, which is provided with 400 layers of acrylic resin and polycarbonate. Compared with a case wherein a polarized light separator is not employed, the brightness in the perpendicular direction is enhanced about 1.5 times as much as that in the case.

EXAMPLE 9

Figure 6:
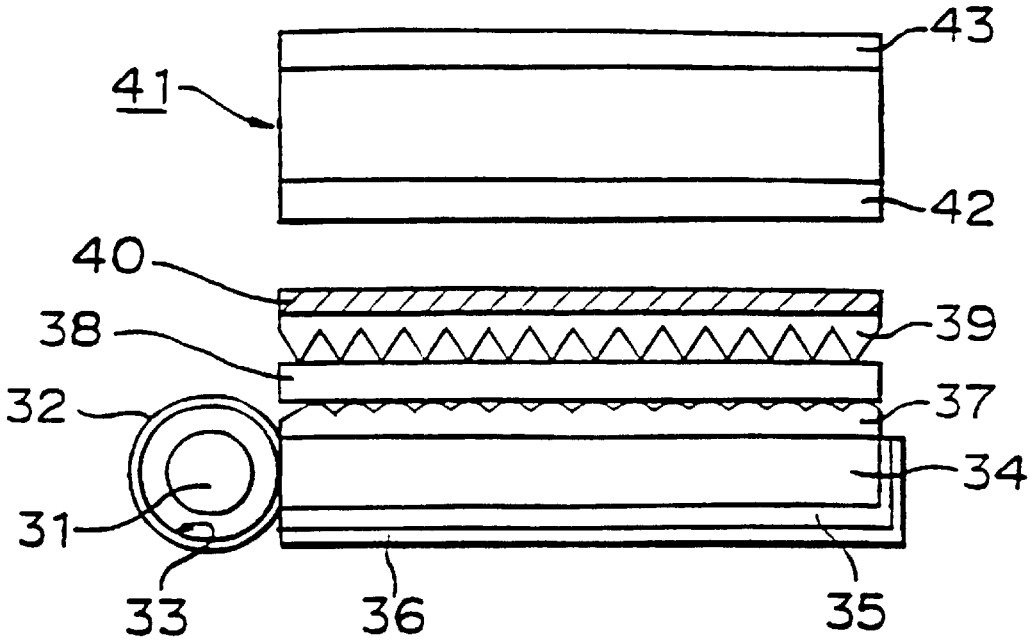
FIG. 6 is a sectional diagram showing another example of the present invention.
Figure 7:
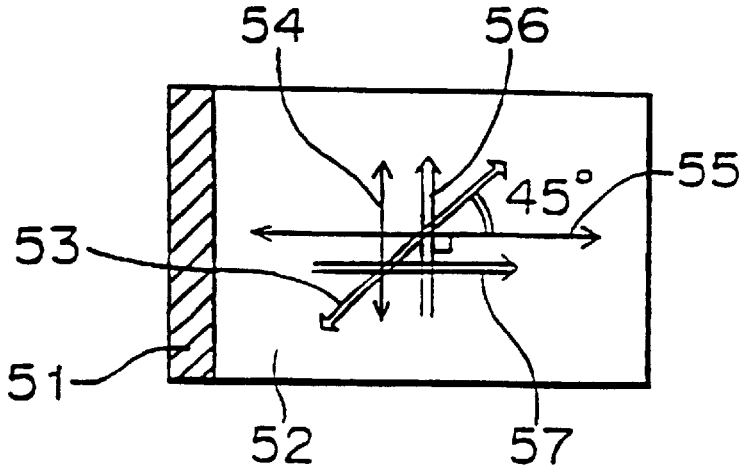
FIG. 7 is a plane view showing an arrangement of optical axes of FIG. 6.

An explanation will be given of another Example of this invention in reference to FIGS. 6 and 7.

An edge light type backlight is employed wherein a fluorescent lamp 31 (CCFL) is attached to a side of a transparent acrylic resin plate light guide 34 which is an illumination plane, and light is introduced into the light guide by providing a lamp cover 32 including a reflecting body 33.

As the fluorescent lamp 31, a CCFL having a length corresponding to a side face length (125 mm) of a general notebook type personal computer and a tube diameter of 3 mm. Further, as the lamp cover 32, a reflecting mirror having a cylindrical shape or an elliptical column shape surrounding the CCFL, is employed, and as the light guide 34, a light-transmitting light guiding plate (n=1.49) is employed which is made of an acrylic resin and is provided with a size of 128 mm×225 mm×2.8 mm.

Further, a λ/4 phase interference plate 35 is provided on the backface of the light guide 34 and a side face of the light guide opposing the fluorescent lamp, on which a reflecting plane 36 made of an aluminum metal reflecting film is formed.

A lenticular lens array 37 is employed and is disposed such that the protruded portions thereof face a polarized light separator 38. The thickness of the lenticular lens array is 2 mm and the pitch thereof is approximately 30 μm. The lenticular lens array 37 and the light guide 34 employ an acrylic resin of the same material. Further, an optical adhesive agent having the refractive index of 1.49 which is the same with that of the acrylic resin, is employed between the lenticular lens array 37 and the light guide 34.

As the polarized light separator 38, one layer of titanium oxide ($TiO_2$:n=2.35) is formed on the surface of a homogeneous glass substrate (n=1.52) by the film thickness of approximately 640 Å, and is provided on the light emitting plane side of the light guide 33. The separating angle of the polarized light separator is 72°. That is, approximately 100% of the p polarized light component having the angle of incidence of 72° transmits through the polarized light separator, and there is almost no reflection, but only approximately 15% of the s polarized light component transmits therethrough and 85% thereof is reflected.

The polarized light emitted from the polarized light separator, is polarized in the perpendicular direction with respect to the linear light source.

Further, as a prism array 39, a prism array each prism having a sectional shape of an isosceless triangle having the apex angle of 65°, is employed, and is disposed such that the apex faces the polarized light separator 38. The thickness of the prism array plate is 2 mm and the pitch thereof is approximately 30 μm. In this way, the light quantity of a light ray of which transmitting direction is approximately perpendicular to the light guiding plate can be enhanced.

Further, a λ/2 retardation plate 40 is provided on the external side of the prism array 39. The fast axis of the λ/2 retardation plate is inclined by θ=45° with respect to the direction perpendicular to the light source as in FIG. 7. The material employs a PC (polycarbonate), which is provided with the birefringence of λ/2 when measured by the wavelength of 550 nm. In FIG. 7, a numeral 51 designates a fluorescent lamp, 52, a light guide, 53, the direction of fast axis, 54, an optical axis of polarization for a light-incidence side polarizing sheet, 55, an optical axis of polarization for a light-emitting side polarizing sheet, 56, a rubbing direction on the light-incident side, and 57, a rubbing direction on the light-emitting side.

A TFT liquid crystal display cell of color display is employed for a liquid crystal panel 41. A normal light absorbing type organic polarized sheet is employed for a light-incident side polarizing sheet 42. The optical axis of polarization is θ=90°. A normal light-absorbing type organic polarizing sheet is also employed for a light-emitting side polarizing sheet 43. The optical axis of polarization is θ=0°. The rubbing direction on the light-incident side is θ=90°, and the rubbing direction on the light-emitting side is θ=0°.

Since the light emitted from the polarized light separator is provided with much linearly polarized light having a direction perpendicular to the light source, when the optical axis of polarization of the light-incident side polarizing sheet which is in use in this Example, is 90°, the increase of brightness of approximately three times as much as the brightness of a liquid crystal display device, is provided by employing the λ/2 retardation plate which is inclined by 45°, and the utilization efficiency of light is promoted.

EXAMPLE 10

Further, one layer of titania is formed on the retardation plate PC, in place of the polarized light separator and the λ/2 phase difference plate in Example 9, which is provided with the both functions, and which is disposed between the lenticular lens and the prism array, with the side of the interference film on the side of the light source. The retardation plate of PC is provided with the birefringence of λ/2, when measured by a wavelength of 550 nm with respect to the incident light having the angle of incidence of approximately 60°. A result approximately similar to those in the above Examples were provided thereby.

According to the present invention, an illumination device for a direct viewing type display element having especially high substantial brightness with respect to a specified region having a high contrast ratio, can be provided. Especially, in this invention, the brightness is promoted with respect to a desired viewing direction, by converting light which does not substantially contributes to the illumination light of the display device, among lights of a desired viewing direction, into a polarized light, which is different from a case wherein a single prism array and the like is employed. Accordingly, an illumination device having a high brightness in a specific direction, is provided while maintaining a wide illuminance distribution. This is most pertinent to an illumination device for a direct viewing type display element having a wide viewing angle.

Further, a defused light which is pertinent as an illumination light for a direct viewing type display element can easily be provided by employing a so-called edge light type light source as a light emitting means. Further, when especially a polarized light converting means is constructed by cooperating a polarized light separating plane provided on the light-emitting phase side of a light guide for an edge light, with a light reflecting plane provided on a side of a flat light guide opposite to the light-emitting face, the light guide for an edge light can be employed as a space for separating a polarized light. Accordingly, this is more preferable since a very compact construction can be provided.

Further, a direct viewing liquid crystal display device having a high illuminance in a practical viewing angle and a small power consumption can be provided, by disposing the illumination device of this invention on the backface of the liquid crystal display element, such that the direction of an optical axis of a light ray emitted from the illumination device approximately agrees with the direction of an optical axis of polarization sheet on the light-incident side of the liquid crystal display element.

We claim:

[1. An illumination device for a direct viewing type display element, comprising:

a flat light guide;

a light source set such that light is incident on a side portion of said flat light guide;

a polarized light separating sheet set on a light emitting side of the flat light guide for transmitting a p polarized light component and reflecting at least a portion of an s polarized light component with respect to a light ray substantially having a predetermined direction of incidence; and a light reflecting sheet disposed on another side opposite to and facing said light emitting side of the flat light guide in parallel with the emitting side, said light reflecting sheet converting said portion of s polarized light component reflected by said polarized light separating sheet into p polarized light and reflecting the converted p polarized light to said polarized light separating sheet for transmission of the converted p polarized light through said polarized light separating sheet in overlapping relationship with the p polarized light component.]

[2. The illumination device for a direct viewing type display element according to claim 1, wherein the polarized light separating sheet is comprising a multi-layered structure wherein light transmitting media having a relatively large refractive index and light transmitting media having a relatively small refractive index are laminated.]

[3. The illumination device for a direct viewing type display element according to claim 1, wherein the polarized light separating sheet comprises a transparent supporter and at least one dielectric thin film laminated on said transparent supporter having a thickness which is equal to or smaller than a wavelength of visible light.]

[4. The illumination device for a direct viewing type display element according to claim 1, wherein the polarized light separating sheet comprises a plurality of laminated transparent polymer layers having different refractive indices.]

[5. A liquid crystal display device, wherein the illumination device according to claim 1 is disposed on a rear side of a direct viewing type liquid crystal display element such that a principle polarization direction of emitted light from the illumination device substantially agrees with a direction of an optical axis of polarization of a polarizing sheet on a light-incident side of a liquid crystal display element.]

[6. The liquid crystal display device according to claim 5 further comprising:

a light deflecting means disposed between the polarized light separating sheet and the liquid crystal display element for deflecting a direction of a light ray maximizing a light intensity among light distributing directions to a direction substantially perpendicular to a display face of the liquid crystal display element.]

[7. The liquid crystal display device according to claim 5, further comprising:

a means for rotating polarization direction disposed between the illumination device and the liquid crystal display element for rotating the principle direction of emitted light.]

[8. An illumination device for a direct viewing type display element, comprising:

a flat light emitting means for emitting a diffused light including a first polarized light component having a first direction of polarization and a second polarized light component having a second direction of polarization perpendicular to the first direction of polarization; and a polarized light converting and emitting means disposed in an optical path of a light emitted from said flat light emitting means for emitting said first polarized light component and for emitting, in overlapping relationship with the emitted first polarized light component, at least a portion of said second polarized light component after selectively converting said portion of said second polarized light component into the first polarized light component.]

[9. An illumination device for a direct viewing type display element, comprising:

a flat light guide;

a light source set such that light is incident on a side portion of said flat light guide;

a polarized light separating sheet set on a light emitting side of the flat light guide for transmitting a p polarized light component and reflecting at least a portion of an s polarized light component with respect to light rays substantially having a predetermined direction of incidence; and a light reflecting sheet disposed on another side opposite to and facing said light emitting side of the flat light guide in parallel with the emitting side, said light reflecting sheet converting said portion of s polarized light component reflected by said polarized light separating sheet into p polarized light and reflecting the converted p polarized light to said polarized light separating sheet for transmission of the converted p polarized light trough said polarized light separating sheet in overlapping relationship with the p polarized light component.]

[10. The illumination device for a direct viewing type display element according to claim 9, wherein the polarized light separating sheet comprises a transparent supporter and at least one dielectric thin film laminated on said transparent supporter having a thickness which is equal to or smaller than a wavelength of visible light.]

[11. The illumination device for a direct viewing type display element according to claim 9, wherein the polarized light separating sheet is composed of a multi-layer structure including alternately laminated light transmitting media, having a refractive index, $n_0$, and other transmitting media, having a refractive index, $n_1$, smaller than the refractive index $n_0$.]

[12. The illumination device for a direct viewing type display element according to claim 9, wherein a $\lambda/4$ phase interference plate is provided on the back face of the light guide and a side face of the light guide opposing the light source.]

[13. The illumination device for a direct viewing type display element according to claim 10, wherein a $\lambda/4$ phase interference plate is provided on the back face of the light guide and a side face of the light guide opposing the light source.]

[14. The illumination device for a direct viewing type display element according to claim 9, wherein a prism shape is formed on a surface of the light guide.]

[15. The illumination device for a direct viewing type display element according to claim 14, wherein the prism shape is a lenticular lens array.]

[16. The illumination device for a direct viewing type display element according to claim 9, further comprising a light deflector.]

[17. The illumination device for a direct viewing type display element according to claim 16, wherein a micro lens array or prism array having a lenticular shape or Fresnel shape is employed as the light deflector.]

[18. An illumination device for a direct viewing type display element, comprising:

a flat light guide;

a light source set such that light is incident on a side portion of said flat light guide;

a polarized light separating sheet set on a light emitting side of the flat light guide for transmitting a p polarized light component and reflecting at least a portion of an s polarized light component with respect to a light ray substantially having a predetermined direction of incidence; and a light reflecting sheet disposed on another side opposite to and facing said light emitting side of the flat light guide in parallel with the emitting side, wherein said polarized light separating sheet is planar and parallel to the light emitting side of the flat light guide and is set in proximity to the flat light guide in the light emitting direction.]

*19. In an illumination device for a direct viewing type display element including a display face, the improvement comprising:*

*a planar polarized light separating sheet comprising at least two opposed planar layers with different refractive properties, said planar polarized light separating sheet separating incident light into a first polarized light component which is transmitted through the display face and a second polarized light component which is at least partially reflected; and*

*a reflecting element disposed opposite said planar polarized light separating sheet to produce phase-interference of the second polarized light component and reflect light resulting from said phase-interference to said planar polarized light separating sheet.*

*20. The illumination device according to claim 19, wherein said polarized light separating sheet comprises at least one planar plastic layer.*

*21. The illumination device according to claim 20, wherein said at least one planar plastic layer is obtained by extrusion.*

*22. The illumination device of claim 21, wherein said polarized light separating sheet comprises plural planar layers including said at least one plastic layer obtained by multi-layer extrusion.*

*23. The illumination device according to claim 22, further comprising:*

*a microlens array or a prism array which converts a direction of light distribution of the light for a display element.*

*24. The illumination device according to claim 23, wherein the direction of light distribution of light for said display element is substantially perpendicular to said display element.*

*25. The illumination device according to claim 21, further comprising:*

*a microlens array or a prism array which converts a direction of light distribution of the light for a display element.*

*26. The illumination device according to claim 20, further comprising:*

*a microlens array or a prism array which converts a direction of light distribution of the light for a display element.*

*27. The illumination device according to claim 26, wherein said polarized light separating sheet comprises at least one planar polymer layer.*

*28. The illumination device according to claim 27, wherein said at least one planar polymer layer is obtained by extrusion.*

*29. The illumination device of claim 28, wherein said polarized light separating sheet comprises plural planar layers including said at least one polymer obtained by multi-layer extrusion.*

*30. The illumination device according to claim 29, wherein said polarized light separating sheet comprises plural planar polymer layers having a thickness not less than 0.05 μm and not more than 0.45 μm.*

*31. The illumination device according to claim 30, further comprising:*

*a microlens array or a prism array which converts a direction of light distribution of the light for a display element.*

*32. The illumination device according to claim 31, wherein the direction of light distribution of light for said display element is substantially perpendicular to said display element.*

*33. The illumination device according to claim 29, further comprising:*

*a microlens array or a prism array which converts a direction of light distribution of the light for a display element.*

*34. The illumination device according to claim 33, wherein the direction of light distribution of light for said display element is substantially perpendicular to said display element.*

*35. The illumination device according to claim 28, further comprising:*

*a microlens array or a prism array which converts a direction of light distribution of the light for a display element.*

*36. The illumination device according to claim 27, wherein said polarized light separating sheet comprises plural planar polymer layers having a thickness not less than 0.05 μm and not more than 0.45 μm.*

*37. The illumination device according to claim 27, further comprising:*

*a microlens array or a prism array which converts a direction of light distribution of the light for a display element.*

*38. The illumination device according to claim 36, further comprising:*

*a microlens array or a prism array which converts a direction of light distribution of the light for a display element.*

*39. The illumination device according to claim 36, wherein the direction of light distribution of light for said display element is substantially perpendicular to said display element.*

*40. The illumination device according to claim 19, further comprising:*

*a microlens array or a prism array which converts a direction of light distribution of the light for a display element.*

* * * * *